US005357669A

United States Patent [19]

Orphanos et al.

[11] Patent Number: 5,357,669

[45] Date of Patent: Oct. 25, 1994

[54] CRIMPING AND SHEARING APPARATUS

[75] Inventors: David W. Orphanos, Mohrsville; David J. Erb, Harrisburg, both of Pa.

[73] Assignee: The Whitaker Corporation, Wilmington, Del.

[21] Appl. No.: 28,674

[22] Filed: Mar. 9, 1993

[51] Int. Cl.[5] ....................... B23P 19/00; H01R 43/04

[52] U.S. Cl. ....................................... 29/566.3; 29/753

[58] Field of Search ..................... 29/566.3, 753, 566.2, 29/564.8, 566.1, 749, 33 M, 866, 861, 862, 863

[56] References Cited

U.S. PATENT DOCUMENTS

| | | | |
|---|---|---|---|
| 3,101,765 | 8/1963 | Batcheller | 29/566.3 X |
| 3,875,662 | 4/1975 | Folk | 29/753 X |
| 3,911,717 | 10/1975 | Yuda | 72/331 |
| 3,946,145 | 3/1976 | Warner | 29/33 M X |
| 4,019,362 | 4/1977 | McKeever | 72/421 |
| 4,246,771 | 1/1981 | Covill et al. | 29/753 X |
| 4,351,110 | 9/1982 | Folk | 29/749 |
| 4,587,725 | 5/1986 | Ogawa | 29/753 |
| 4,707,913 | 11/1987 | Moline | 29/753 |
| 4,831,727 | 5/1989 | Johnson, Jr. et al. | 29/866 |

*Primary Examiner*—William Briggs
*Attorney, Agent, or Firm*—Robert J. Kapalka

[57] ABSTRACT

An apparatus which automatically trims an exposed end of a conductor to a proper length, inserts the exposed end in a terminal and crimps the terminal thereto, all in a single operation, is disclosed. The apparatus includes anvil tooling for supporting the terminal during a crimping operation. A ram movable toward and away from the anvil tooling has a first cutting edge which defines a boundary between a conductor permitted zone and a conductor excluded zone during movement of the ram toward the anvil tooling. The ram has a first crimping die disposed in the conductor permitted zone. The first crimping die captures the conductor and crimps the terminal to the conductor. A conductor shearing element is disposed in the conductor excluded zone. The conductor shearing element has a second cutting edge which cooperates with the first cutting edge during movement of the ram toward the anvil tooling for trimming any portion of the conductor which extends across the boundary.

15 Claims, 11 Drawing Sheets

CRIMPING AND SHEARING APPARATUS

BACKGROUND OF THE INVENTION

1. Field of the Invention

The invention relates to an apparatus for crimping a terminal to a conductor wherein the conductor is to be excluded from a non-crimpable portion of the terminal. In particular the invention relates to an apparatus wherein a conductor which is introduced to the apparatus is trimmed with respect to the terminal and the terminal is crimped thereto, all in a single operation.

2. Prior Art

Terminals to be crimped to electrical conductors typically have a crimpable portion and a non-crimpable portion. The crimpable portion is attached to the conductor by applying a load so as to deform the crimpable portion around an end of the conductor and tightly grip the end therein. The non-crimpable portion is reserved for attachment to a mating connector of an electrical device, and it is desirable that the end of the conductor be excluded from the non-crimpable portion so as not to interfere with a secure attachment to the mating connector. The end of the conductor may extend to an intermediate portion of the terminal between the crimpable and non-crimpable portions.

Machines for crimping terminals to conductors are well-known. Some of these machines automatically position end portions of the conductors with respect to their associated terminals so that the end portions do not extend into the non-crimpable portions of the terminals. Such machines have mechanisms which index successive ones of a plurality of terminals to a crimping station, and successively feed the ends of the conductors to a preselected location with respect to the terminals so that the ends remain outward of the non-crimpable portion after the crimping.

Some crimping machines do not have automatic mechanisms for positioning the conductor ends with respect to their associated terminals. One application of crimping machines without automatic positioning may be found in the production of magnet wires for motors, transformers, etc. Typically, two or more magnet wires are crimped in a single terminal. Ends of the magnet wires are manually introduced to a crimping machine by an operator who must take care to ensure that the ends do not extend into the non-crimpable, box end of the terminal. Further, the magnet wires typically have a protective straw which is slidable over the wires. An end of the straw is crimped in a specially adapted end portion of the crimpable portion of the terminal. A length of the wires must extend from the straw and be crimped in the remainder of the crimpable portion of the terminal to effect an electrical connection therewith. The operator must take care to maintain a relationship between the end of the wires and the end of the straw while manually inserting the wires to a particular depth with respect to the terminal. There is a need for an apparatus which will make it easier for the operator of a manual feed crimping machine to crimp a terminal to magnet wire while maintaining a proper relationship between an end of the magnet wire and its protective covering.

The above-described crimping machines require manual feeding of the wire conductors, but the machines typically have an automatic mechanism for feeding successive terminals from a strip of terminals which may be, for example, wound on a roll. Each of the terminals must be severed from the strip either before or after the crimping operation. It would be advantageous to combine a mechanism for severing terminals from the strip with a mechanism for correctly locating the ends of the wire and protective covering with respect to a terminal to be crimped thereon.

SUMMARY OF THE INVENTION

It is an object of the invention to provide a crimping apparatus which is especially adapted for crimping terminals to conductors which are manually introduced into the apparatus.

It is another object of the invention to provide a crimping apparatus which is especially adapted for crimping a terminal having a crimpable portion adapted to receive a conductor, and a non-crimpable portion from which the conductor is to be excluded.

It is a further object of the invention to provide a crimping apparatus which automatically positions a conductor at a preferred location with respect to a terminal to be crimped thereon.

It is yet another object of the invention to provide a crimping apparatus which automatically controls respective positions of the ends of a conductor and its protective covering in a crimped terminal.

It is still another object of the invention to provide a crimping apparatus which trims a conductor with respect to a terminal, crimps the terminal on the conductor, and severs the terminal from a strip of terminals, all in a single operation.

These and other objects are accomplished by a crimping apparatus including an anvil having a terminal support surface for supporting the terminal during a crimping operation. A ram movable toward and away from the anvil has a first cutting edge which defines a boundary between a conductor permitted zone and a conductor excluded zone during movement of the ram toward the anvil. The ram has a first crimping die disposed in the conductor permitted zone and adapted to capture a conductor introduced in a conductor reception zone between the ram and the anvil, to transport the conductor to the terminal, and to crimp the terminal to the conductor. A conductor shearing element is disposed in the conductor excluded zone. The conductor shearing element has a second cutting edge which is adapted to cooperate with the first cutting edge during movement of the ram toward the anvil for trimming any portion of the conductor which extends across the boundary.

Prior to a crimping operation, a terminal is supported on the terminal support surface such that the crimpable portion is in the conductor permitted zone and the non-crimpable portion is in the conductor excluded zone. When a conductor is introduced in the reception zone such that an end portion of the conductor randomly extends across the boundary, movement of the ram toward the anvil trims the conductor at the boundary and captures the conductor for transport to and crimping in the terminal. The portion of the conductor which is captured and transported to the terminal is automatically positioned on the terminal so that the conductor does not extend into the non-crimpable portion of the terminal. The terminal is also crimped to the conductor in a single operation.

According to another aspect of the invention, the terminal support surface defines a plane, and the ram is movable along a line of movement perpendicular to the plane. The first cutting edge is disposed along a straight line at an angle to the line of movement such that the boundary defines a plane perpendicular to the plane of the terminal support surface.

According to a further aspect of the invention, a terminal cutting blade is connected for movement in synchronization with the ram. The terminal cutting blade is disposed for severing the terminal to be crimped from a plurality of terminals attached along a strip. The terminal cutting blade is preferably carried by the ram.

According to a still another aspect of the invention, the apparatus includes a stop member disposed in the conductor permitted zone and having a stop face at a distance from the boundary for engaging an edge of a protective straw which is carried by the conductor. When the edge of the protective straw is abutted against the stop face, movement of the ram toward the anvil trims an exposed end of the conductor to a predetermined length, transports the conductor and the straw to the terminal, and crimps the terminal to the conductor and the straw.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 11:
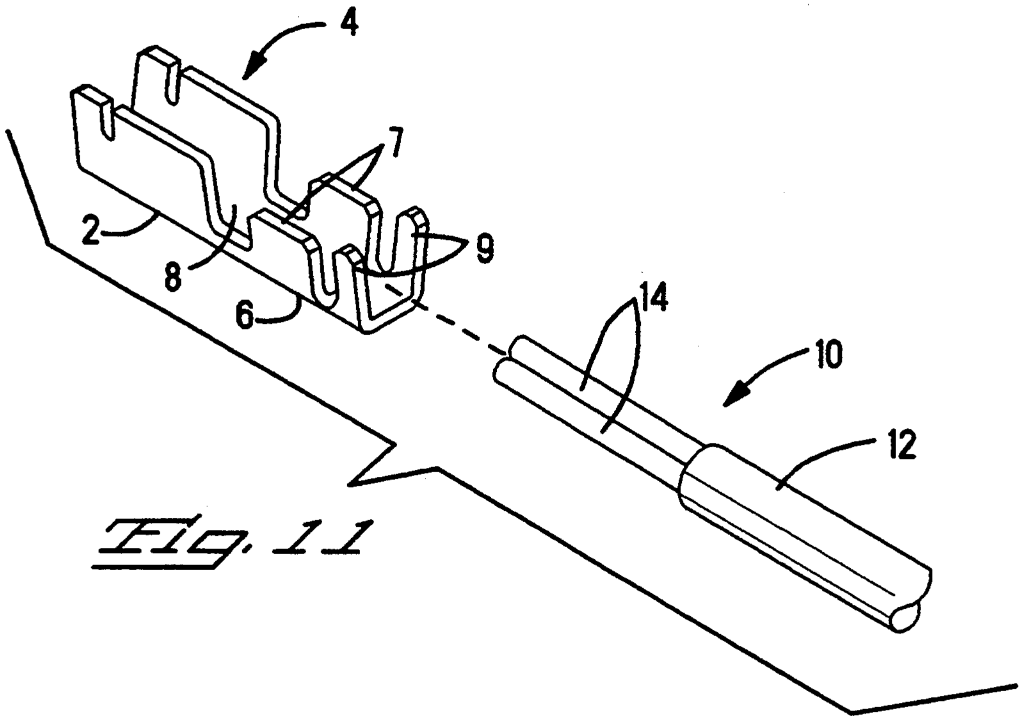
FIG. 11 is a perspective view of a terminal and conductor suitable for processing by the crimping apparatus according to the invention.

The present invention is especially useful for crimping a terminal 4 as shown in FIG. 11 to a conductor shown generally as 10. The terminal 4 has a crimpable portion 6 including a transition portion 8 which is joined to a non-crimpable portion 2. The non-crimpable portion 2 defines a U-shaped box member that is insertable in a connector housing (not shown) to facilitate connection in an electrical circuit. The crimpable portion 6 has crimpable arms 7 that are deformable by a crimping die (not shown) to tightly engage exposed ends 14 of the conductor 10 in order to make an electrical connection therewith. The conductor 10 typically comprises a pair of magnet wires having the exposed ends 14 as shown in the drawings, but the conductor 10 may comprise a single wire or several wires, any number of which can be processed without deviating from the scope of the invention. The conductor 10 carries a protective and insulative straw 12 that is slidable axially along the conductor 10, the straw being selected from among a group of straws having different internal dimensions according to the number of magnet wires to be protected therein so that the straw closely surrounds the magnet wires. The crimpable portion 6 of the terminal 4 has crimpable arms 9 that are also deformable by a crimping die (not shown) to tightly engage an end of the protective straw 12, thereby preventing slippage of the straw 12 along the conductor 10 and accidental exposure of the conductor.

Figure 12:
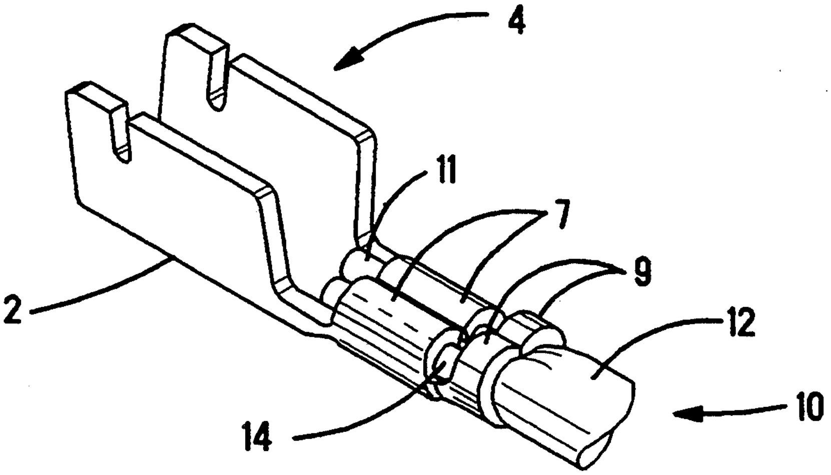
FIG. 12 is a perspective view of the terminal and conductor after being crimped by the crimping apparatus according to the invention.

FIG. 12 illustrates the terminal 4 after it has been crimped to the conductor 10. A portion of the exposed ends 14 of the conductor is engaged by the crimpable arms 7. A non-crimped portion 11 of the ends 14 is referred to as the "brush" of the conductor. It is desired that the brush extend a short distance beyond the crimpable arms 7 to enable visual verification that the exposed ends 14 extend through and are engaged by the crimpable arms 7. However, the brush must not extend into the non-crimpable portion 2 so that it does not cause interference or jamming when the non-crimpable portion 2 is inserted into a connector housing. Also, the terminal is ordinarily provided as one of a strip of terminals wound on a spool. The present invention is particularly suited for trimming the brush to a correct length, crimping the conductor and straw within the terminal, and severing the crimped terminal from the strip of terminals, all in a single operation.

Figure 1:
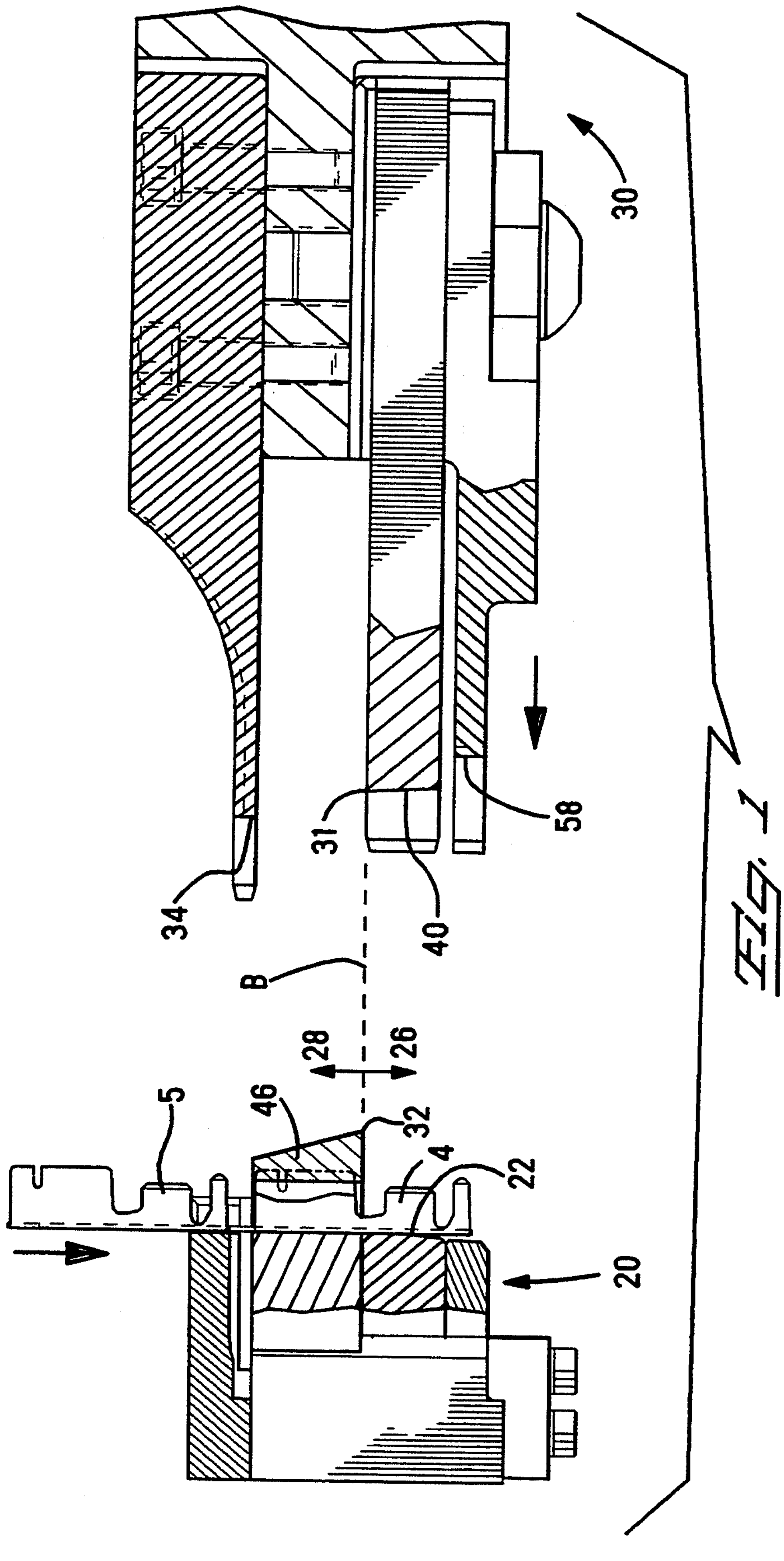
FIG. 1 is a partial cross-sectional top view of a crimping apparatus according to the invention, some elements not being shown in order to better illustrate selected zones of the invention.
Figure 9:
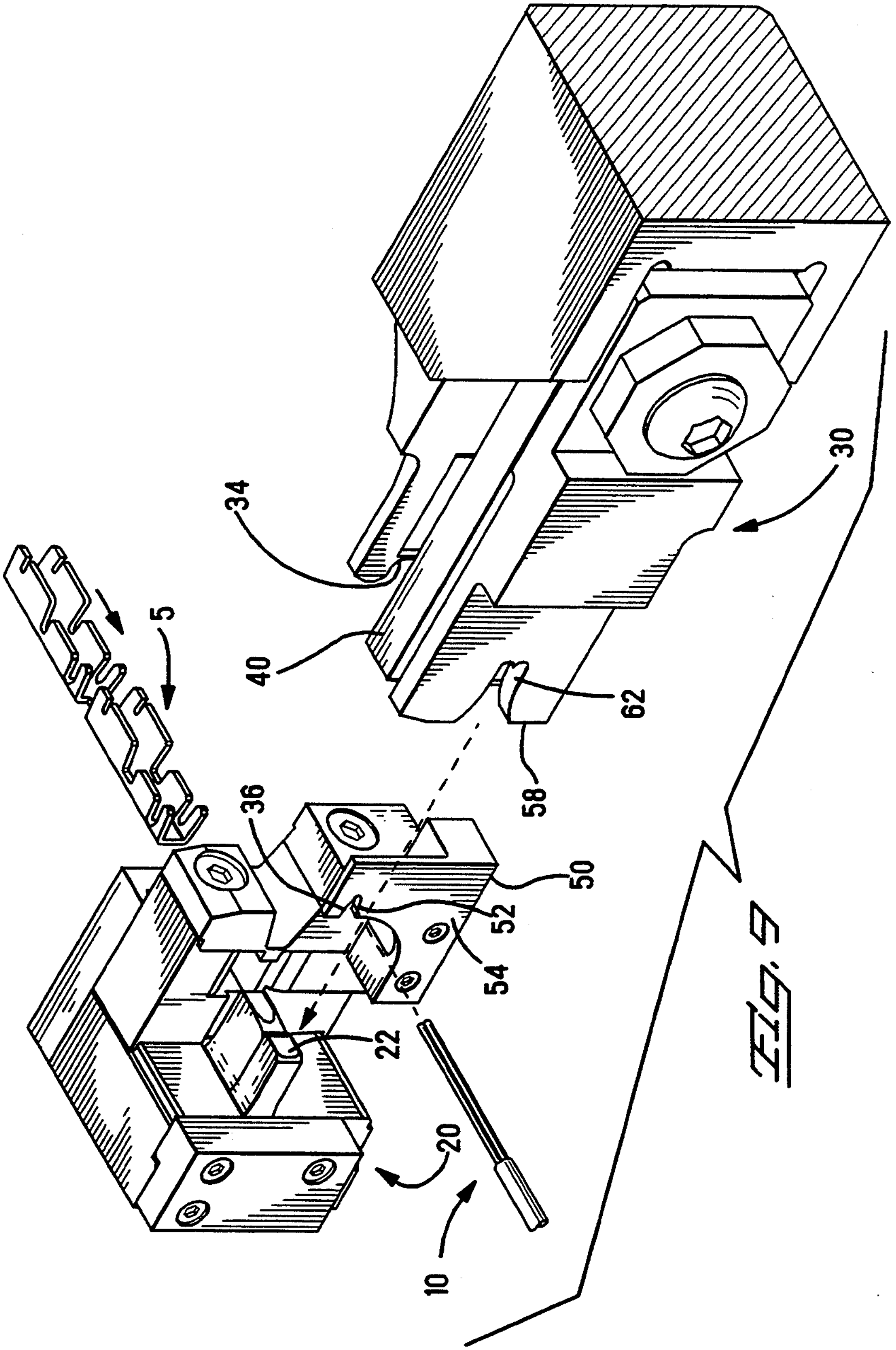
FIG. 9 is top front perspective view of the crimping apparatus according to the invention.
Figure 10:
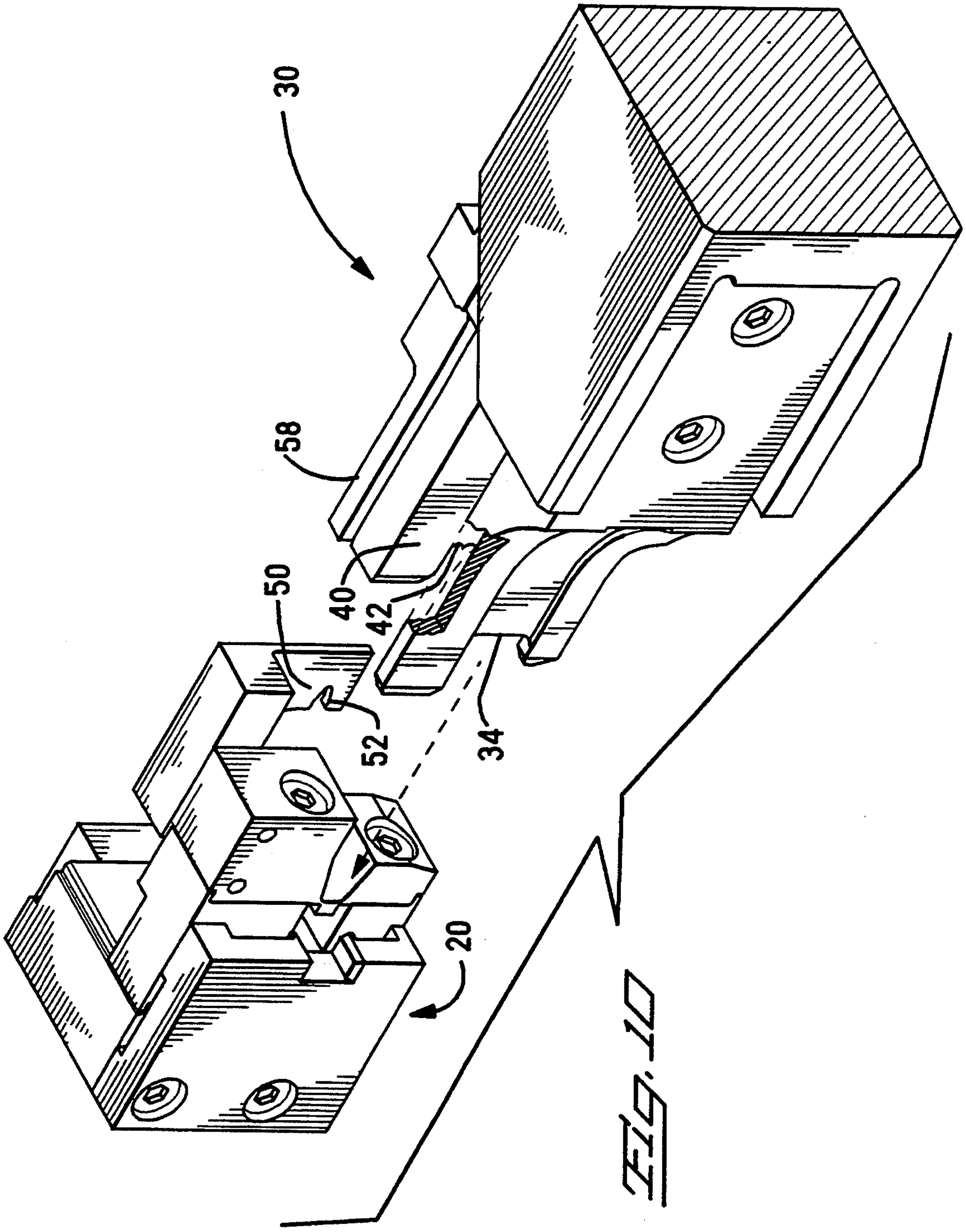
FIG. 10 is a bottom rear perspective view of the crimping apparatus according to the invention.

Referring now to FIGS. 1 and 9, a crimping apparatus according to the invention includes anvil tooling 20 having a terminal support surface 22 for supporting the terminal 4 during a crimping operation. The terminal 4 is an end terminal connected to adjacent terminal 5 of an indefinitely long strip of like terminals. The terminal support surface 22 is preferably configured to match a bottom surface profile of whatever style terminal is to be crimped thereon. For the terminal 4 illustrated in the drawings, the support surface 22 is substantially planar.

A ram shown generally as 30 is connected to a motive source (not shown) for movement toward and away from the anvil tooling 20. The motive source may be, for example, an extensible cylinder operable by pneumatic or hydraulic forces. In the preferred embodiment shown, the ram 30 is movable along a straight line perpendicular to the terminal support surface 22. However, it will be understood by those skilled in the art that the ram could be moved pivotally or even at an acute angle with respect to the terminal support surface without exceeding the scope of the invention, and the present discussion of a preferred embodiment is not intended to be limiting in scope.

The ram 30 has a first cutting edge 31 which, during movement of the ram 30 toward the anvil tooling 20, delineates a boundary B between a conductor permitted zone 26 and a conductor excluded zone 28. In the preferred embodiment shown in the drawings, the first cutting edge 31 is disposed along a straight line at an angle to the line of movement of the ram 30, and the boundary B defines a plane perpendicular to the plane of the terminal support surface 22.

The ram 30 carries a conductor capture member 40 in the conductor permitted zone 26. The capture member 40 has a recess 42, shown in FIG. 7, for capturing a conductor introduced in a conductor reception zone 36 between the ram and the anvil and transporting the conductor to the crimpable portion of the terminal 4. Walls of the recess 42 also serve as a first crimping die for crimping the terminal 4 to a conductor which has been transported to the terminal by the capture member 40.

A conductor shearing element 46 is supported in the conductor excluded zone 28. The shearing element 46 has a second cutting edge 32 which is adapted to cooperate with the first cutting edge 31 for trimming any portion of a conductor which extends across the boundary B.

The ram 30 carries a straw capture member 58 which has a recess 62 configured to capture the straw 12 and transport the straw to the terminal 4 during movement of the ram toward the anvil. Walls of the recess 62 also serve as a second crimping die for deforming the crimpable arms 9 about the straw 12 which has been transported to the terminal 4.

The ram 30 also carries a terminal cutting blade 34 for severing the terminal 4 from the next successive terminal 5.

Prior to initiating a crimping operation, the terminal 4 is initially positioned on the anvil tooling 20 so that it extends across the boundary B as shown in FIG. 1. The non-crimpable portion 2 of the terminal is disposed entirely in the conductor excluded zone 28 adjacent to the boundary B, and the remainder of the terminal is disposed in the conductor permitted zone 26. The initial positioning of the terminal 4 on the anvil is performed manually by the machine operator.

Figure 2:
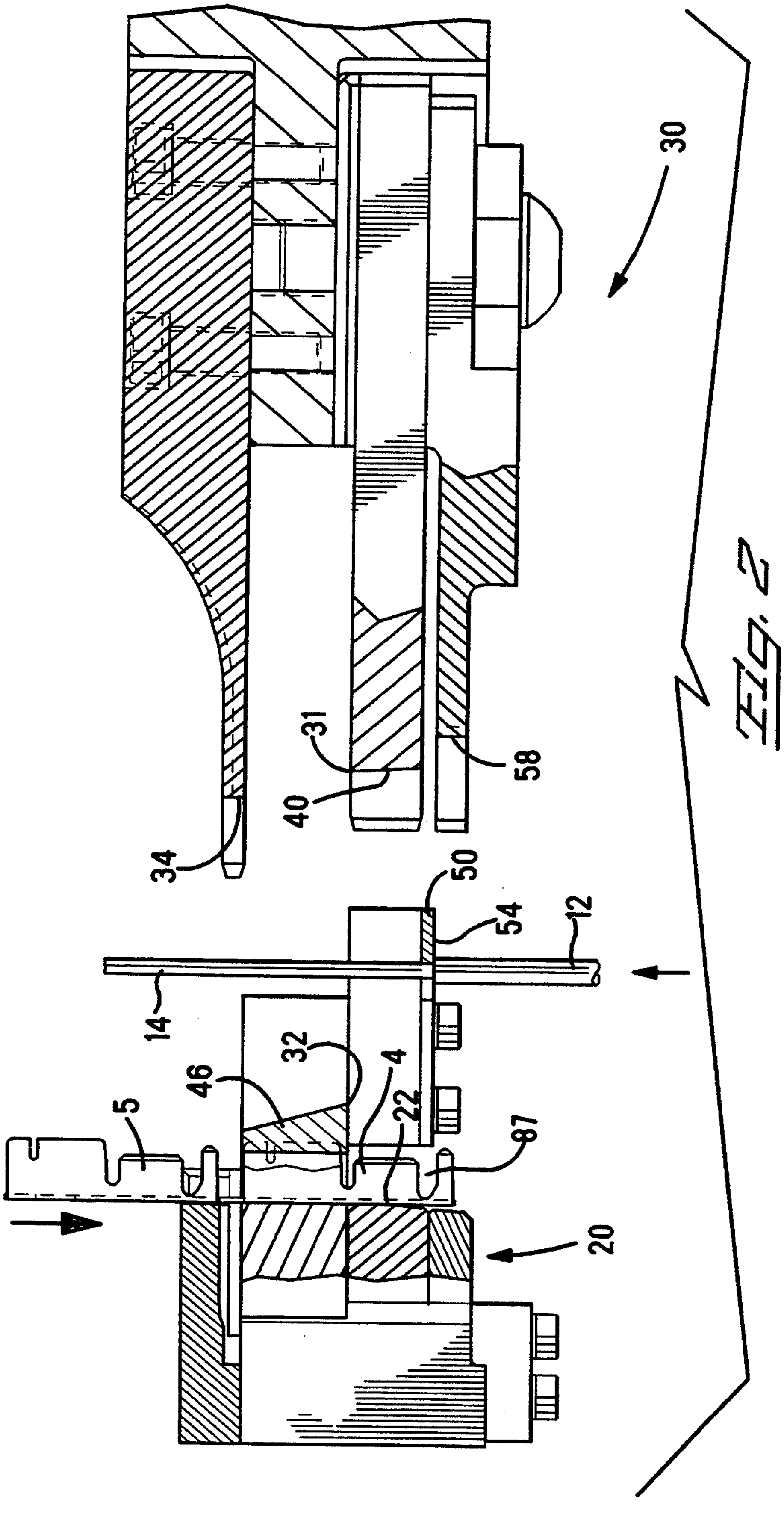
FIG. 2 is a partial cross-sectional top view of the crimping apparatus showing a ram retracted and a conductor disposed in a reception zone prior to being crimped in a terminal.
Figure 7:
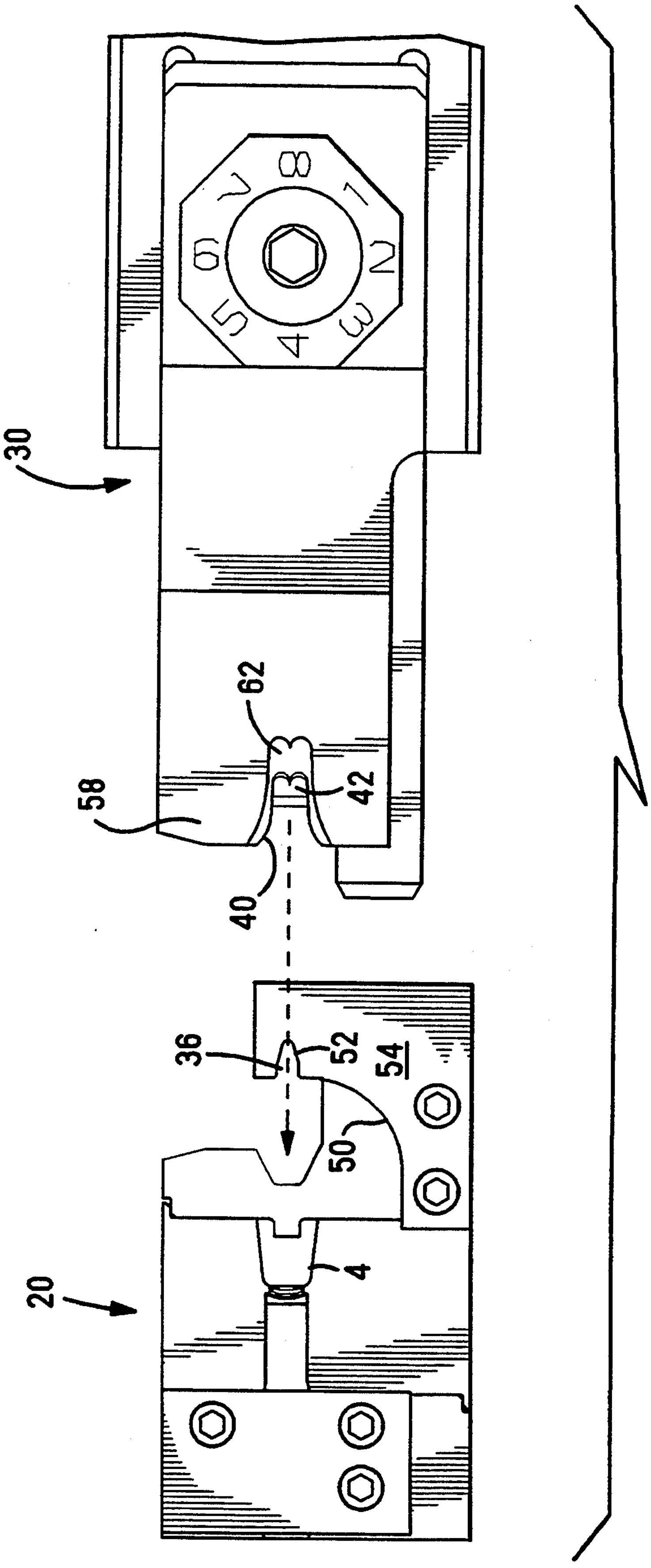
FIG. 7 is a front view of the crimping apparatus having the ram retracted without a conductor disposed in the reception zone.
Figure 8:
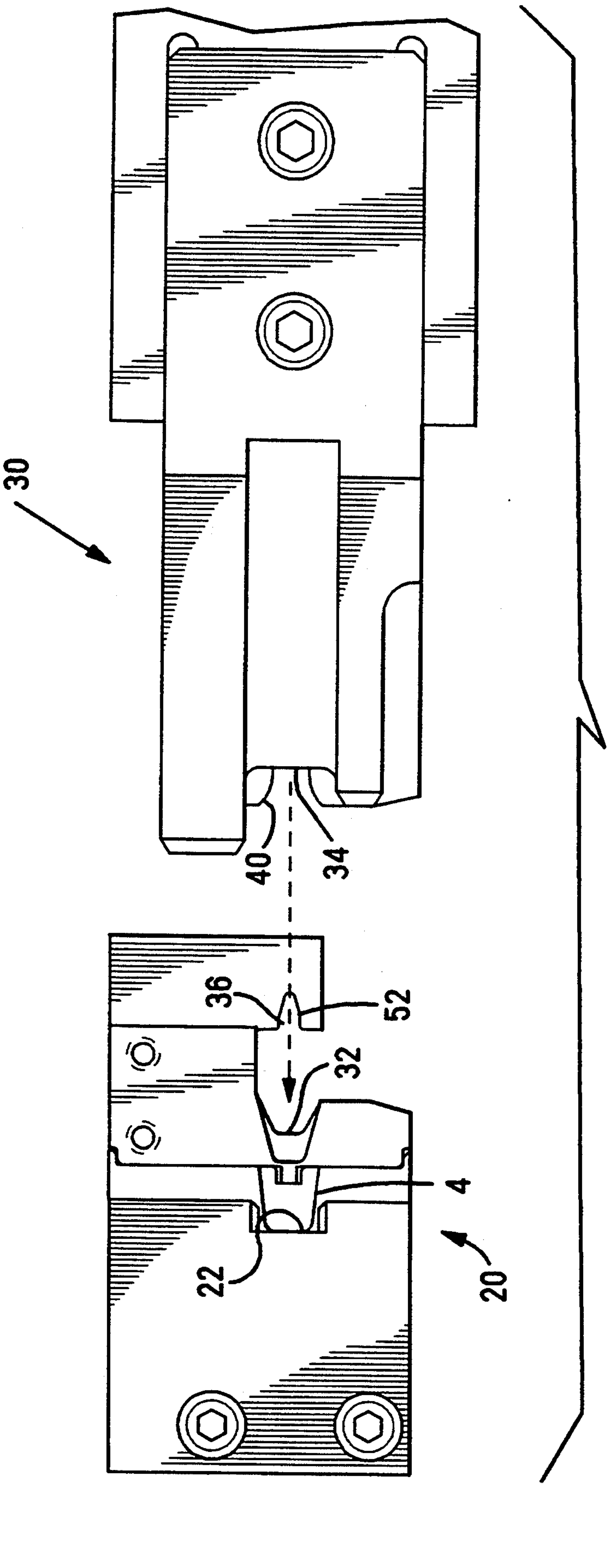
FIG. 8 is a rear view of the crimping apparatus having the ram retracted.

Referring now to FIGS. 2, 7 and 9, a stop member 50 in the conductor permitted zone has a stop face 54 at a predetermined location with respect to the boundary B. In the preferred embodiment shown, a notch 52 extending through the stop member 50 establishes a location of the conductor reception zone 36. The stop face 54 serves as an abutment against which an end of the straw 12 is engaged when the conductor 10 is inserted into the reception zone 36. The location of the stop face 54 is selected to correspond with a location of transition zone 18 between the crimpable arms 7 and the crimpable arms 9 of the terminal 4 when the terminal is properly positioned on the anvil tooling 20. The stop face 54 assures that an end of the straw 12 is present in the transition zone 18 after the conductor 10 is crimped in the terminal 4 as will be more fully described hereinafter.

As shown in FIGS. 2, 7 and 9, the conductor is manually introduced in the conductor reception zone 36 from a side of the apparatus associated with the conductor permitted zone 26. A portion of the conductor should be allowed to extend arbitrarily a short distance beyond the boundary B into the conductor excluded zone 28. The machine operator moves the exposed ends 14 of the conductor laterally into the notch 52 and abuts the end of the straw 12 against the stop face 54. The operator need not be concerned about the precise length of the exposed ends 14 that extends beyond the straw 12. It is only necessary that the exposed ends 14 extend across the boundary B, and this is easily accomplished by allowing the exposed ends 14 to extend some distance, for example 2 or 3 inches, beyond the straw 12.

Figure 3:
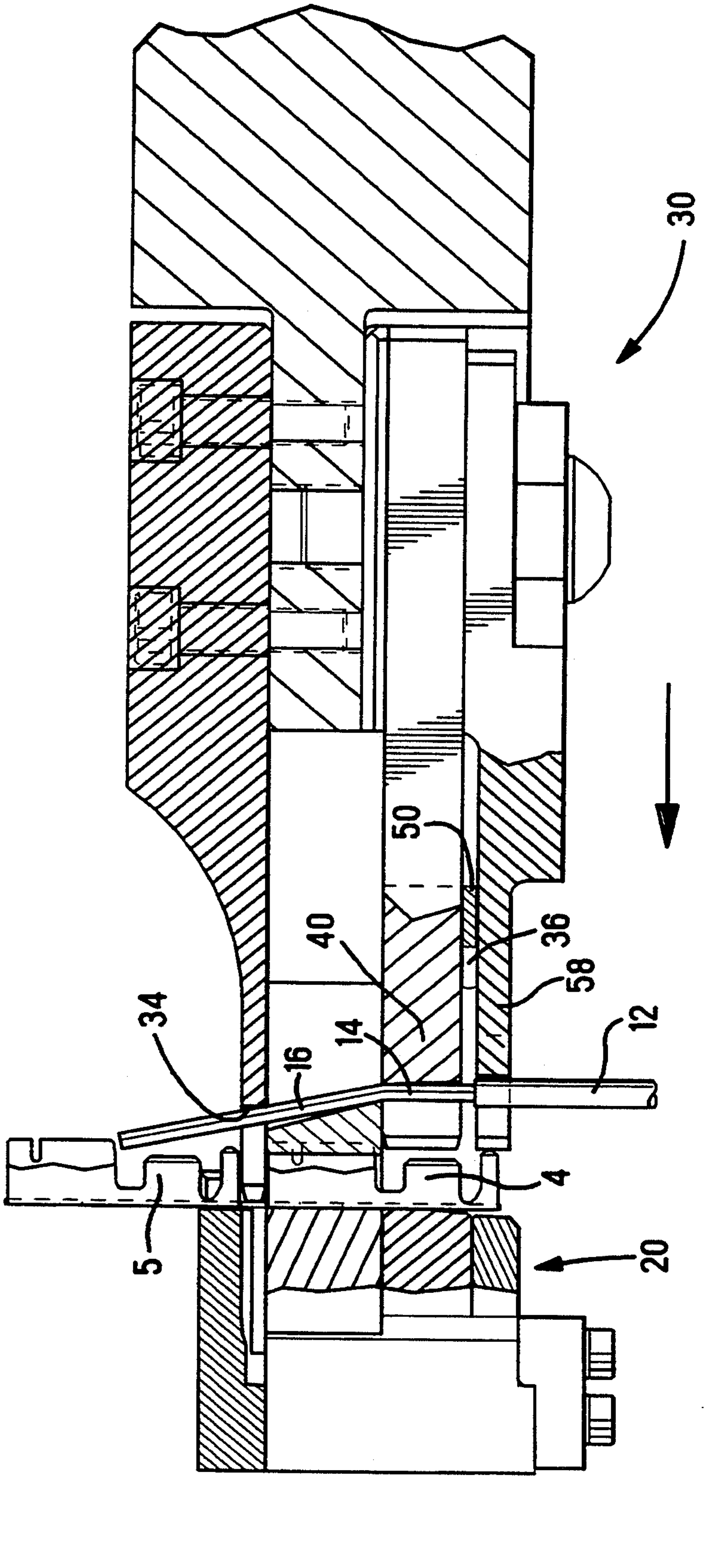
FIG. 3 is a partial cross-sectional top view of the crimping apparatus during transport of the conductor to the terminal to be crimped thereon.
Figure 4:
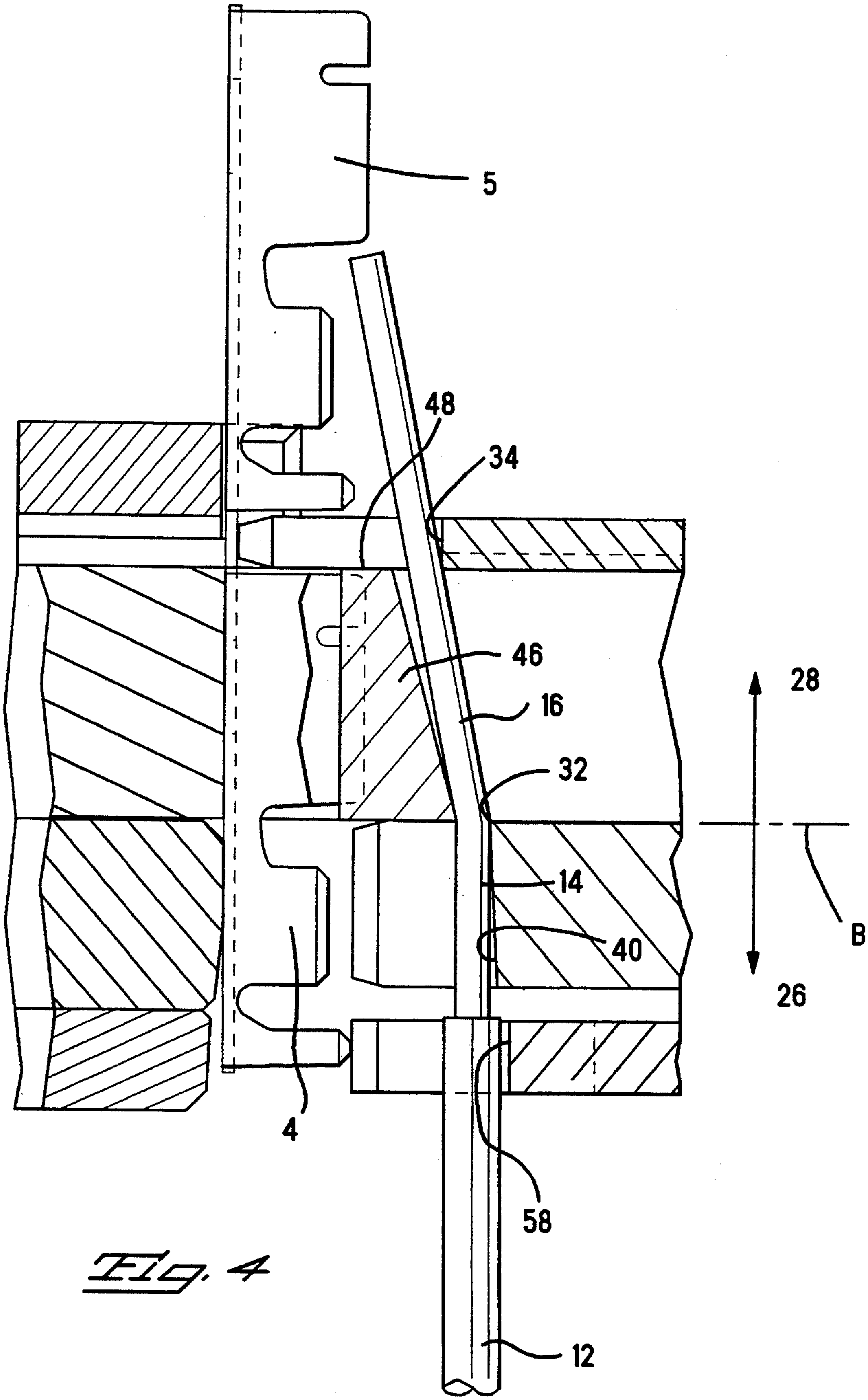
FIG. 4 is an enlarged view of a portion of FIG. 3.
Figure 5:
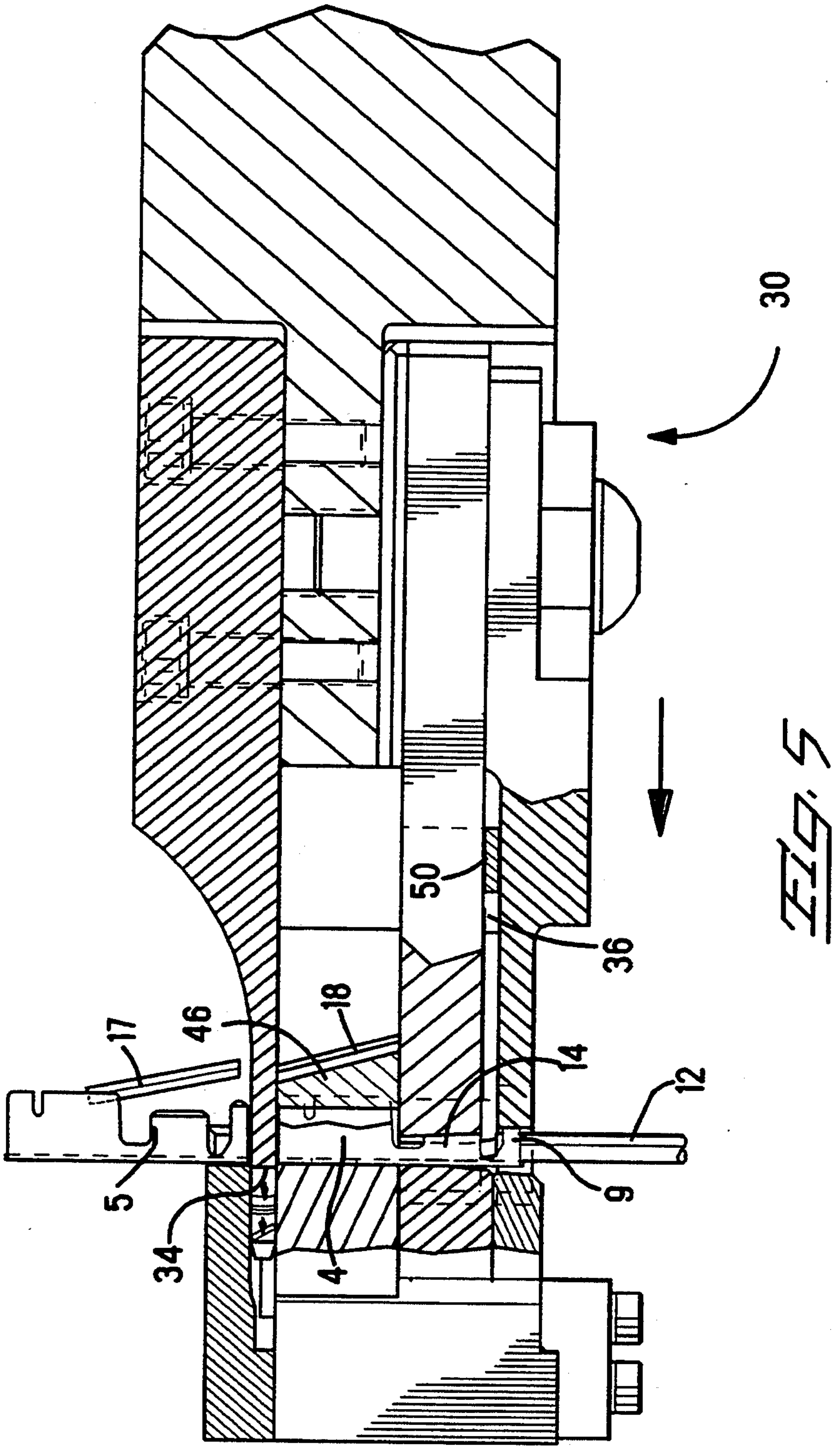
FIG. 5 is a partial cross-sectional top view of the crimping apparatus after trimming the conductor and transporting it to the terminal, and severing the terminal from a terminal strip.
Figure 6:
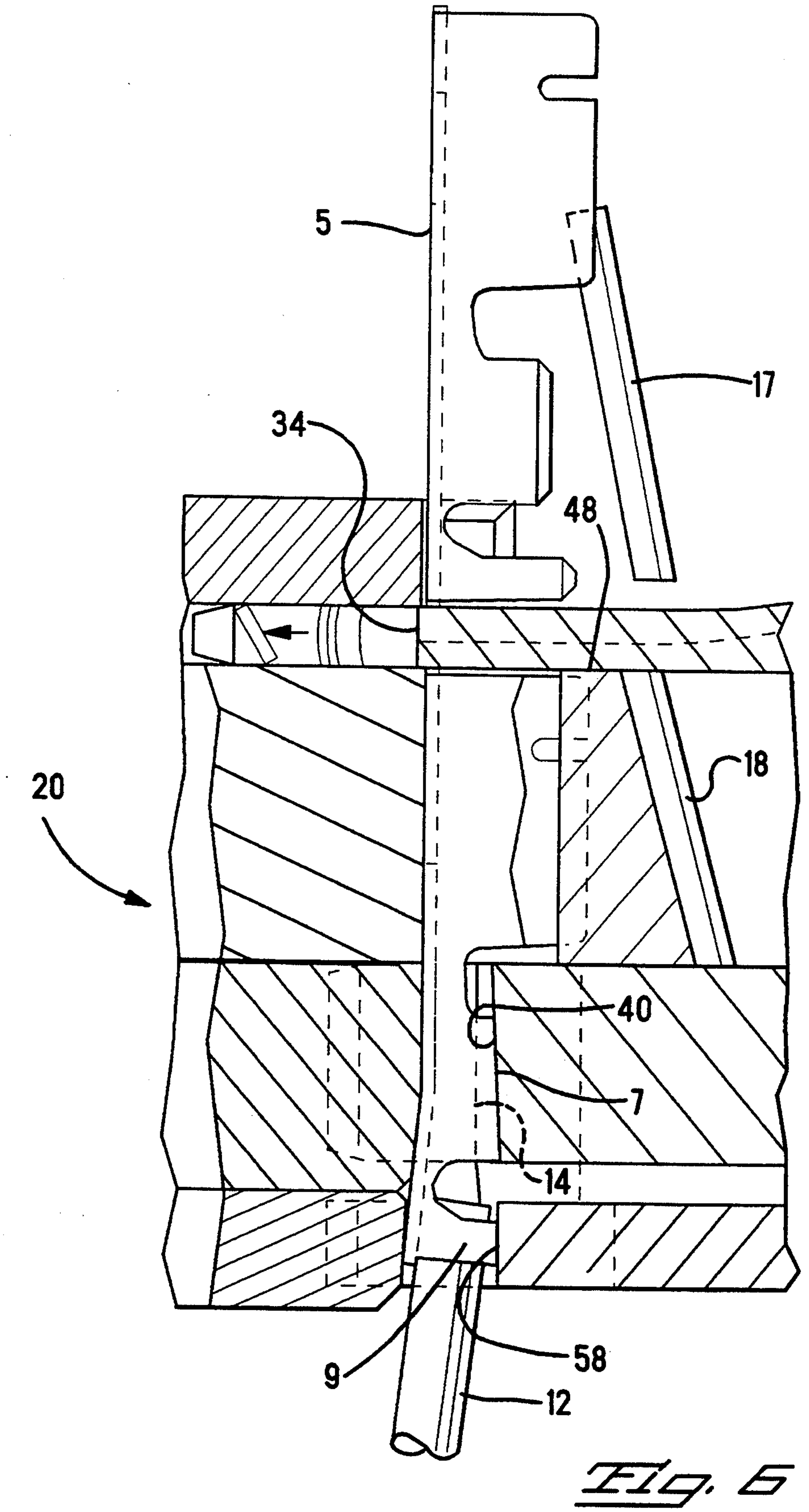
FIG. 6 is an enlarged view of a portion of FIG. 5.

When the conductor 10 is in the reception zone and the straw 12 is engaged against the stop face 54, the ram 30 is cycled by the operator using a foot switch or other equivalent to send a signal to the motive source which powers the ram. Movement of the ram 30 toward the anvil tooling 20 is swift so that momentum is available to aid in deforming the crimpable portion of the terminal during the crimping operation. As the ram moves toward the anvil tooling, the conductor capture member 40 and the straw capture member 58 contact their respective portions of the conductor 10 and transport the conductor rapidly to the terminal 4 disposed on the anvil tooling. At an intermediate position during transport of the conductor as shown in FIGS. 3 and 4, the conductor is sheared at the boundary B by the first cutting edge 31 passing in close proximity to the second cutting edge 32, whereby an end 16 of the conductor that extends beyond the boundary B into the excluded zone 28 is severed from the conductor. Substantially concurrent therewith, the cutting blade 34 engages the severed end 16 and, in cooperation with the shearing element 46, cuts the severed end 16 into two pieces 17, 18, as shown in FIGS. 5 and 6. The cutting of the severed end 16 is incidental to movement of the cutting blade 34 with the ram 30 and is not a necessary feature of the invention. The severed end 16 is waste material and it will only be cut by the blade 34 if it extends beyond back edge 48 of the shearing element 46.

As ram movement continues to the position shown in FIGS. 5 and 6, the capture members 40 and 58 continue to transport the conductor ends 14 along with the straw 12 within the permitted zone 26 to the terminal 4. As the ram 30 completes its stroke, the walls of the recesses 42 and 62, which are profiled as crimping dies, engage the crimpable arms 7 and 9, respectively, and deform the arms 7 and 9 so as to provide a secure crimp about the exposed ends 14 and the straw 12. Simultaneously during the last portion of the ram movement, the cutting blade 34 impacts the terminal strip between the terminals 4 and 5, thereby severing the terminal 4 from the terminal strip.

Upon retraction of the ram 30, the conductor 10 having the terminal 4 crimped thereon can be freely removed from the crimping apparatus for further processing by the operator. The terminal 5 is then advanced by either manual or automatic means to a position on the anvil tooling 20 with the crimpable portion of the terminal in the conductor permitted zone and the non-crimpable portion in the conductor excluded zone.

A crimping and shearing apparatus according to the invention has several advantages. The apparatus automatically trims an exposed end of a conductor with respect to its protective straw so that a desired length of the exposed end extends from the straw. The apparatus maintains a relationship between the end of the conductor and the end of the straw while transporting the conductor and straw to a terminal to be crimped thereto. The apparatus crimps the terminal to the conductor and straw while simultaneously severing the terminal from a strip of like terminals. All of these functions are performed at a single station during a single, quick ram stroke.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

We claim:

1. An apparatus for crimping a terminal to a conductor, the terminal having a crimpable portion adapted to receive the conductor and a non-crimpable portion from which said conductor is to be excluded, the apparatus comprising:

anvil tooling having a terminal support surface for supporting the terminal during the crimping operation; a ram movable toward and away from the anvil tooling, the ram having a first cutting edge which defines a boundary between a conductor permitted zone and a conductor excluded zone during movement of the ram toward the anvil tooling, the ram having a conductor capture member disposed in the conductor permitted zone and adapted to capture a conductor introduced in a conductor reception zone between the ram and the anvil tooling and transport the conductor to the terminal;

a conductor shearing element disposed in the conductor excluded zone, the conductor shearing element having a second cutting edge adapted to cooperate with the first cutting edge during movement of the ram toward the anvil tooling for trimming any portion of the conductor which extends across the boundary;

a stop member disposed in the conductor permitted zone and having a stop face at a distance from the boundary for engaging an edge of a protective straw that is disposed over a portion of the conductor;

a straw capture member carried by the ram and adapted to capture the straw during movement of the ram toward the anvil tooling and transport the straw to the terminal;

a first crimping die connected for movement in synchronization with the ram and disposed for crimping the terminal to the conductor which has been transported thereto; and, a second crimping die connected for movement in synchronization with the ram and disposed for crimping the terminal to the straw which has been transported thereto;

wherein when the terminal is supported on the terminal support surface such that the crimpable portion is in the conductor permitted zone and the non-crimpable portion is in the conductor excluded zone, and when the conductor is introduced in the reception zone such that a portion of the conductor extends across the boundary, movement of the ram toward the anvil tooling trims the conductor at the boundary whereby the conductor which is captured by the conductor capture member and transported to the terminal does not extend beyond the crimpable portion of the terminal and is crimpable therein by the first crimping die.

2. The apparatus according to claim 1, wherein the first crimping die is integral with the conductor capture member.

3. The apparatus according to claim 1, wherein the terminal support surface defines a plane, and the ram is movable along a line of movement perpendicular to the plane.

4. The apparatus according to claim 3, wherein the first cutting edge is disposed along a straight line at an angle to the line of movement such that the boundary defines a plane perpendicular to the plane of the terminal support surface.

5. The apparatus according to claim 4, wherein the first crimping die is integral with the conductor capture member.

6. The apparatus according to claim 1, wherein the terminal to be crimped is one of a plurality of terminals attached along a strip, and further comprising a terminal cutting blade connected for movement in synchronization with the ram and disposed for severing the terminal from the strip substantially concurrent with the crimping of the terminal to the conductor.

7. The apparatus according to claim 6, wherein the terminal cutting blade is carried by the ram.

8. The apparatus according to claim 6, further comprising a terminal positioning mechanism for positioning the terminal with the crimpable portion in the conductor permitted zone and the non-crimpable portion in the conductor excluded zone.

9. An apparatus for crimping a conductor to a terminal, the terminal having a crimpable portion adapted to receive the conductor and a non-crimpable portion from which said conductor is to be excluded, the apparatus comprising:

anvil tooling having a terminal support surface for supporting the terminal during the crimping operation;

a ram movable toward and away from the anvil tooling, the ram having a first crimping die adapted to capture a conductor introduced in a conductor reception zone between the ram and the anvil tooling, to transport the conductor to the terminal during movement of the ram toward the anvil tooling, and to crimp the terminal to the conductor, the first crimping die having a first cutting edge at an end thereof;

a conductor shearing element having a second cutting edge adapted to cooperate with the first cutting edge during movement of the ram toward the anvil tooling for trimming any portion of the conductor which extends beyond the first cutting edge;

a stop member having a stop face for engaging an edge of a protective straw that is disposed over a portion of the conductor; and, a second crimping die carried by the ram and adapted to capture the straw during movement of the ram toward the anvil tooling to transport the straw to the terminal, and to crimp the terminal to the straw.

10. The apparatus according to claim 9, wherein the terminal to be crimped is one of a plurality of terminals attached along a strip, and further comprising a terminal cutting blade connected for movement in synchronization with the ram and disposed for severing the terminal from the strip substantially concurrent with the crimping of the terminal to the conductor.

11. An apparatus for crimping a terminal to a conductor, the terminal having a crimpable portion adapted to receive the conductor and a non-crimpable portion from which said conductor is to be excluded, the apparatus comprising:

anvil tooling having a substantially planar terminal support surface for supporting the terminal during the crimping operation;

a ram movable toward and away from the anvil tooling along a line of movement perpendicular to the terminal support surface, the ram having a first cutting edge disposed along a line parallel to the terminal support surface, the first cutting edge defining a boundary between a conductor permitted zone and a conductor excluded zone during movement of the ram toward the anvil tooling, the ram having a first crimping die disposed in the conductor permitted zone and adapted to capture a conductor introduced in a conductor reception zone between the ram and the anvil tooling and transport the conductor to the terminal;

a conductor shearing element disposed in the conductor excluded zone, the conductor shearing element having a second cutting edge adapted to cooperate with the first cutting edge during movement of the ram toward the anvil tooling for trimming any portion of the conductor which extends across the boundary;

a stop member disposed in the conductor permitted zone and having a stop face at a distance from the boundary for engaging an edge of a protective straw that is disposed over a portion of the conductor; and, a second crimping die carried by the ram and adapted to capture the straw during movement of the ram toward the anvil tooling, to transport the straw to the terminal, and to crimp the terminal to the straw;

wherein when the terminal is supported on the terminal support surface such that the crimpable portion is in the conductor permitted zone and the non-crimpable portion is in the conductor excluded zone, and when the conductor is introduced in the reception zone such that a portion of the conductor extends across the boundary, movement of the ram toward the anvil tooling trims the conductor at the boundary whereby the conductor which is captured by the first crimping die and transported to the terminal does not extend beyond the crimpable portion of the terminal and is crimpable therein by the first crimping die.

12. The apparatus according to claim 11, wherein the terminal to be crimped is one of a plurality of terminals attached along a strip, and further comprising a terminal cutting blade connected for movement in synchronization with the ram and disposed for severing the terminal from the strip substantially concurrent with the crimping of the terminal to the conductor.

13. The apparatus according to claim 12, wherein the terminal cutting blade is carried by the ram.

14. The apparatus according to claim 12, further comprising a terminal positioning mechanism for positioning the terminal with the crimpable portion in the conductor permitted zone and the non-crimpable portion in the conductor excluded zone.

15. The apparatus according to claim 10, wherein the terminal cutting blade is carried by the ram.

* * * * *

UNITED STATES PATENT AND TRADEMARK OFFICE

CERTIFICATE OF CORRECTION

PATENT NO. : 5,357,669

DATED : October 25, 1994

INVENTOR(S) : David W. Orphanos; David J. Erb; John M. Wasilko

It is certified that error appears in the above-indentified patent and that said Letters Patent is hereby corrected as shown below:

On the title page item [75],

After "David J. Erb, Harrisburg" add --John M. Wasilko, Harrisburg--, and change "both" to--all--.

Signed and Sealed this

Fourteenth Day of March, 1995

Attest:

Bruce Lehman

BRUCE LEHMAN

*Attesting Officer* *Commissioner of Patents and Trademarks*